United States Patent [19]

Giusti et al.

[11] Patent Number: 4,799,943
[45] Date of Patent: Jan. 24, 1989

[54] GAS STREAM DIFFUSING AND DISTRIBUTION APPARATUS

[76] Inventors: Giambattista Giusti, 50 The Fellsway, New Providence, N.J. 07974; Thomas V. Reinauer, 9 Dunnder Dr., Summit, N.J. 07901; Raymond J. DeHont, 4 Brent Pl., Succasunna, N.J. 07876

[21] Appl. No.: 63,009

[22] Filed: Jun. 17, 1987

[51] Int. Cl.⁴ .............................................. B01D 46/00
[52] U.S. Cl. ................................... 55/308; 55/341 R; 55/341.1; 55/418
[58] Field of Search .............. 55/128, 341 R, 341 NT, 55/341 M, 341 MC, 341 PC, 418, 308; 138/40, 43, 44, 46; 139/504, 500

[56] References Cited

U.S. PATENT DOCUMENTS

| 253,346 | 2/1882 | Cook | 55/308 |
| 271,910 | 2/1883 | Patterson | 55/308 |
| 3,570,221 | 3/1971 | Oliver | 55/418 |
| 3,831,354 | 8/1974 | Bakke | 55/341 R |
| 4,655,804 | 4/1987 | Kercheval et al. | 55/341 R |

FOREIGN PATENT DOCUMENTS 441706 3/1927 Fed. Rep. of Germany ........ 138/44

Primary Examiner—Bernard Nozick

[57] ABSTRACT

Gas stream diffusing and distribution apparatus for disposition in the path of a moving gas stream constituted by a series of spaced orifice plates disposed in longitudinally spaced relation in essentially concentric relation with the gas stream.

11 Claims, 3 Drawing Sheets

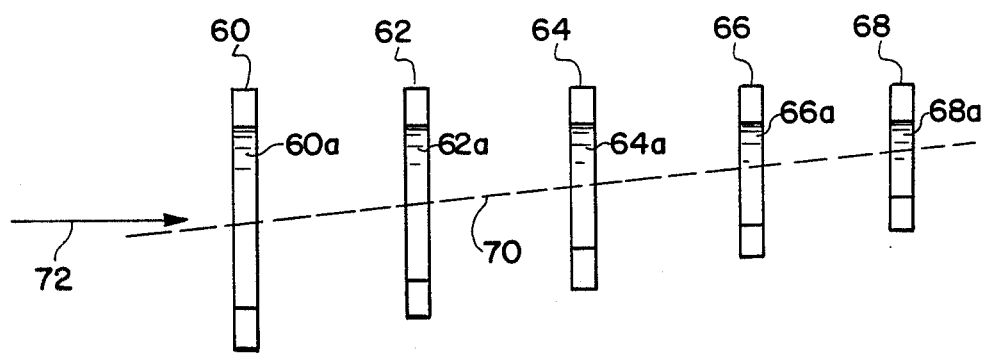
F I G. 3

GAS STREAM DIFFUSING AND DISTRIBUTION APPARATUS

The invention relates to the controlled diffusion or distribution of gas flow at the entry portion of a device for treating such gas or operating upon constituent elements thereof and more particularly to a method and apparatus for effecting the controlled distribution of the inlet gas flow and particulate constituents entrained therein in industrial filter apparatus.

BACKGROUND OF THE INVENTION

It has long been recognized that, in apparatus that treats a flowing gas stream and/or constituents entrained or incorporated therein, a uniform distribution of the incoming gas stream into operative relation with downstream treating elements will result in increased efficiency of operation and extended life of the involved operating components. One area of preferential concern has been in the field of industrial filtration devices, commonly called "baghouses" or dust collectors, which typically employ a large number of filter assemblies, normally tubes or panels, interposed in the path of a flowing gas stream to separate particulate matter suspended and being carried in such flowing gas stream.

In such dust collectors the particulate laden gas stream most commonly enters the filter housing through a breach in the lower housing wall defining a pyramidal or conical dust collecting hopper. Ideally, but not in practice, such particulate laden dust stream then dispenses to uniformly fill the housing and to uniformly pass through the filter media with the entrained particulates being separated by and remaining on the surface of the filter media. The accumulation or build up of separated particulates on the upstream surface of the filter media creates an increasing pressure drop across the filter media and which, unless removed by dislodgement of the particulates, will effect a reduction in the rate of gas flow through the unit. In order to avoid such particulate accumulation on the upstream surface of the filter media, the filter media is periodically cleaned by utilization of various techniques such as pulse jet, reverse flow and shaking. The outcome of such cleaning is that a large portion of the accumulated particulates drops off the filter media and falls downwardly into the collection hopper.

In many industrial filter housings the particulate bearing gas stream enters the filter housing through a breach in the dependent material collection hopper at a sufficiently high velocity, usually in the order of 3500 feet per minute, to maintain the entrainment of the particulates being conveyed directly. As will be apparent such incoming gas stream would not normally slow down and disperse to fill the housing but rather would remain concentrated in a high velocity flow stream that would effect non uniform deposition of the particulates on the filter media and high degrees of localized abrasion on the filter components due to the effects of high velocity impingement of often abrasive particulates thereon. In addition, the inherent traversing of the input gas stream by the dislodged particulates attendant the cleaning operation other results in an untoward degree of particle reentrainment and consequent drop in operating efficiency.

The problem of the destructive and operationally denigrating effects attendant the high speed introduction of the incoming gas stream into the filter housing has been long recognized. In order to alleviate such destructive and operationally denigrating effects the art has taught the interposition of baffles and/or diffusing devices in the path of the incoming gas stream. Initially such baffles were no more than the interposition of a solid plate in and disposed perpendicular to the path of the incoming air stream. Later designs included the interposition of baffle plates at varying angles to the incoming gas stream and the utilization of selectively shaped perforated diffuser elements in the path of the incoming gas stream. Exemplary of the latter approach is U.S. Pat. No. 3,831,354. While such perforated plate diffuser designs did operate to somewhat reduce or ameliorate the abrasive wear and uneven distribution of gas flow they did not solve the basic problem inherent therein.

SUMMARY DESCRIPTION OF THE INVENTION

This invention may be briefly described, in its broader aspects, as gas stream diffusing and distributing apparatus for dispostion within a perimetric housing for a gas treating apparatus in the form of a series of longitudinally spaced and parallel orifice plates disposed in the path of an incoming gas stream and with each of said orifice plates defining an aperture centered on the longitudinal axis of said gas stream surrounded by a perimetric solid border portion. In its narrower aspects the subject invention includes such assemblage of orifice plates disposed in equally spaced relation and with the apertures being of progressively smaller cross sectional area in the direction of gas flow passage therethrough. In a still narrower aspect the invention includes a diffuser and distribution assembly of the type described, disposed in the path of the inlet gas stream in a bag or panel type dust collector or other industrial filter.

Among the advantages of the present invention is a permitted increase in the operating efficiency of gas treating apparatus and an increase in the effective operating life of the component elements thereof. Still other advantages include the improved operation of bag and panel type dust collectors through reducing variations in gas velocity adjacent the filter media with attendant reductions in abrasive damage and detrimental reentrainment of separated dust during filter media cleaning operations.

The object of this invention is the provision of improved gas stream diffusing and distribution apparatus for gas treating apparatus, such as dust collectors and other industrial filters, industrial dryers, heat exchangers and similar apparatus.

Other objects and advantages of the subject invention will become apparent from the following portions of this specification and from the appended drawings which illustrate, in accord with the mandate of the patent statutes, a presently preferred embodiment of a gas stream diffusing and distribution apparatus incorporating the principals of the invention as incorporated in a bag type dust collector.

DESCRIPTION OF THE DRAWINGS

FIG. 3 is a schematic sectional view of a modified configuration of a gas stream diffusing and distributing device incorporating the principles of this invention.

Figure 1:
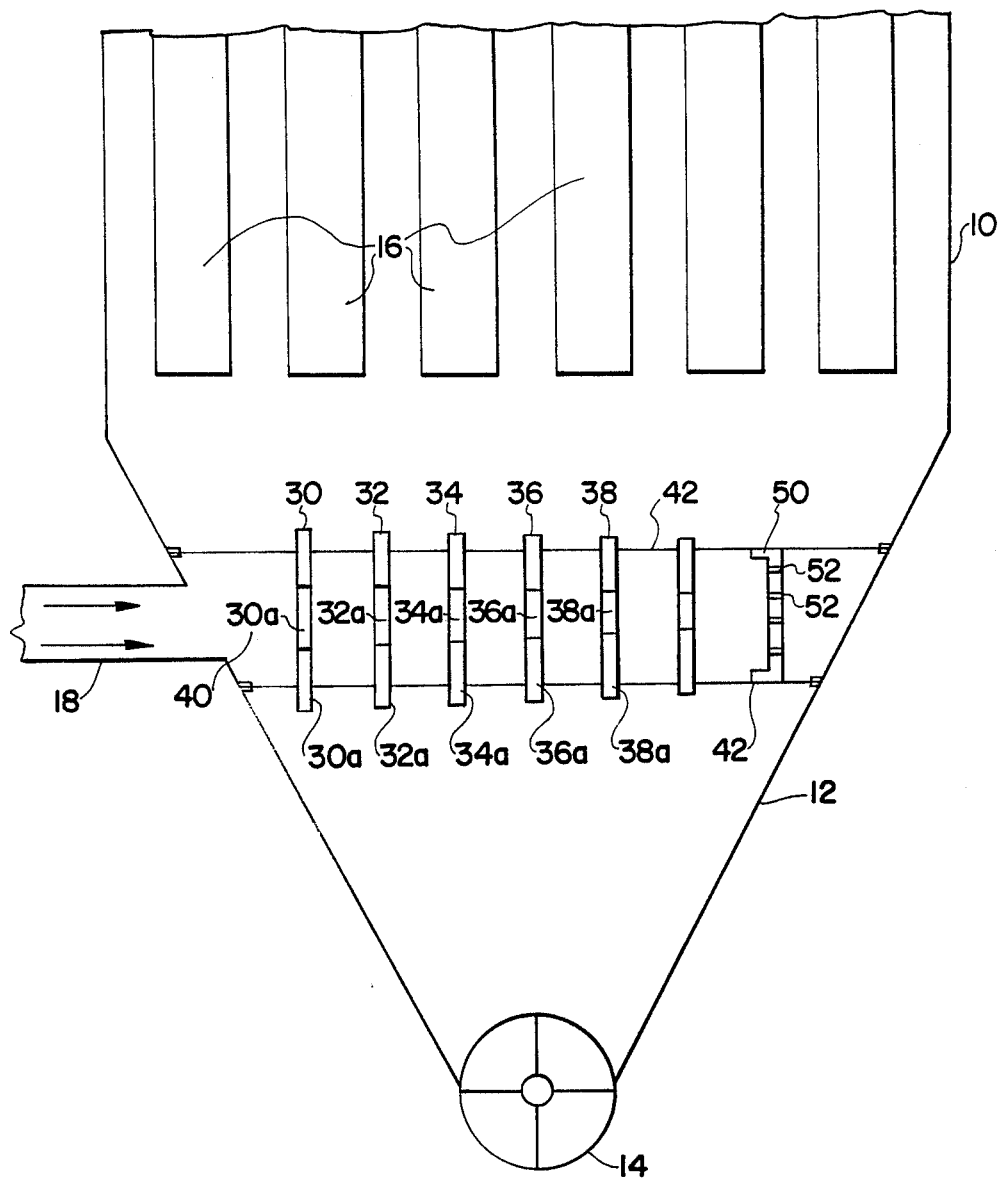
FIG. 1 is a schematic sectional view of a bag type dust collector having a gas stream diffusing and distributing device incorporating the principles of this invention disposed in the material collection hopper thereof.

Referring to the drawings and particularly to FIG. 1, there is schematically depicted elements of a conventional bag type dust collector having a perimetric housing 10 dependently terminating in a conical or pyramidal material receiving hopper 12 having a conventional airlock valve 14 at the apex thereof. Suspended within the housing 10 are a plurality of filter bags 16. In the operation of such type of dust collector, a gas stream having the particulate matter to be separated therefrom is introduced into the hopper 12 through a gas entry conduit 18. Such entry gas stream is introduced at relatively high velocity, usually in the order of 3500 feet per minute, so as to maintain the solid particulates entrained therein. The entry gas stream, if not otherwise impeded, will essentially remain in the form of a coherent high velocity flow stream, traverse the hopper and impinge on the opposite hopper surface before dispersing to move upwardly towards the filter bags 16. As the gas passes through the bags 16, the entrained particulates are accumulated on the outer bag surface. Such increasing accumulation on the bag surfaces results in a concommitant increase in pressure drop across the filter media and, ultimately in reduced gas flow.

In order to equably disperse and distribute the gas flow bearing the entrained particles within the housing 10, a series of orifice plates 30, 32, 34, 36 and 38 are positioned in parallel spaced relation in coaxial alignment with the longitudinal axis 40 of the entering gas stream. Each of the orifice plates 30, 32, 34, 36 and 38 include a central aperture 30a, 32a, 34a, 36a, and 38a surrounded by a solid border area 30b, 32b, 34b, 36b, and 38b, respectively. The orifice plates are preferably spaced apart at equal intervals with the center point of each aperture located on a common axis with the centerline of the gas entry conduit 18 and the longitudinal axis 40 of the entry gas stream. Maintenance of such positional relationship is effected by means of mounting struts 42.

Figure 2:
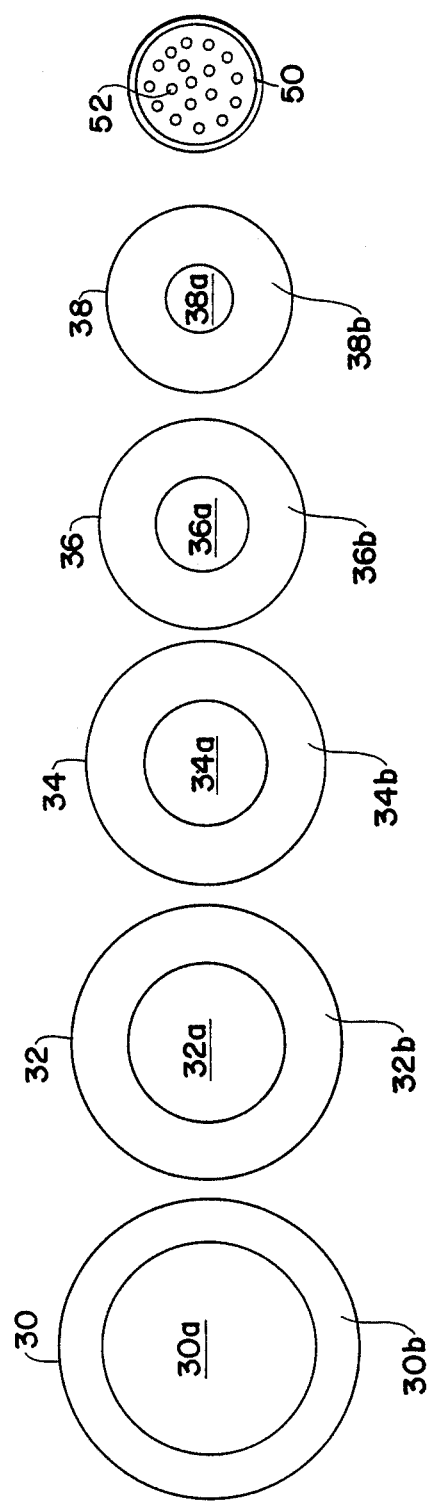
FIG. 2 is a schematic exploded view of the device components with the orifice plates rotated 90° from their normal position.

As is apparent from the drawing FIG. 1, the centerline of the array of orifice plates is horizontal and each of the plates is suspended vertically within the collection hopper 12 and perpendicular to the direction of gas flow through the inlet 18. As also shown in FIG. 2, where each orifice plate is shown rotated through 90°, each orifice plate has a smaller aperture (a) and a smaller border area (b) in the direction of gas stream flow. In general, the number of plates employed and the amount of progressive reduction in both the aperture size and solid border area in the direction of gas stream flow is dependent upon the size and shape of the dust collector housing 10 and hopper 12. As pore clearly depicted (in schematic form) in FIG. 2 the first orifice plate 30 has an open aperture area 30a equivalent to about 80 to 93% and preferably equivalent to 84 to 89% of the open area of the inlet conduit 18. The last or downstream orifice plate 38 has an open aperture area 38a equivalent to about 35 to 40%, and preferably equivalent to about 37%, of the open area of the inlet conduit 18. The size of the open areas 32a, 34a and 36a is governed by the linear projections that extend from the marginal edges of the open area 30a to the marginal edges of the open area 38a. Where such projections or lines intersect the intermediate plates 32, 34, and 36 determines the corresponding size of intermediate apertures 32a, 34a and 36a.

The solid border area 30b should extend 2 or more inches beyond the direct projection of the inlet conduit 18 thereon. The total area of of the first orifice plate 30, i.e. area of 30a and 30b, is at least 150% of the cross-sectional area of the inlet conduit 18. The solid border areas 32b, 34b, 36b and 38b of the remaining orifice plates are desirably determined by maintaining the solid border width dimensions as on the first orifice plate. Since the solid border (b) on each plate surrounds a reduced aperture area (a), the actual area of the solid border and the overall size of each plate is progressively reduced. The progressive reduction in solid area basically functions to reduce the weight of the assembly, since, operationally all of the orifice plates could have identical outer dimensions without a diminution in operational performance.

In addition to the series of orifice plates as described above, the array also preferably includes a downstream flow restricting multiple orifice end plate 50. The plate 50 is sized so as to be larger than the last plate aperture 38a but smaller than the outer diameter of the border portion 38b. As indicated the plate 50 contains a plurality of perforations 52 therein and has a total area, both open area and solid area, of about 150% of the aperture area 38a of the last orifice plate 38. The end plate 50 functions primarily as a flow restriction to maximize the gas flow diversion effects of each of the orifice plates.

In situations where the slope of the wall of the hopper 12 is such as to require the disposition of the first orifice plate 30 relatively remote from the end of the inlet conduit 18, a partial plate in the nature of a chordally modified orifice plate in the nature of an arch can be utilized as the initial plate in the series.

FIG. 3 depicts a modification in diffuser construction. In this embodiment, the series of orifice plates 60, 62, 64, 66 and 68 have their upper ends disposed in coplanar relation and with the centerline 70 of aperture 60a, 62a, 64a, 66a, and 68a being disposed in angularly offset relation to the longitudinal axis 72 of the incoming gas stream.

Empirical work to date indicates that the orifice plate and aperture can be of a shape other than circular, as for example, rectangular.

As will now be apparent to those skilled in the art, the described diffuser and distribution system functions to distribute the inlet gas flow substantially equally within the housing 10. A further advantage is that it resists accumulation of dust thereon due to the limited extent of horizontal surfaces on which dust can accumulate. Additionally, the solid border areas on the orifice plates act as impact surfaces to partially absorb the energy of the moving particles and to thereby reduce their velocity and attendant abrasive wear effected thereby.

Having thus described our invention, we claim:

1. Apparatus for diffusing and distributing an incoming gaseous carrier having particulate matter entrained therein and a filtering device for separating said particulate matter for said gaseous carrier, said filtering device including a gas impervious perimetric housing having a plurality of filters disposed in the upper portion thereof for effecting separation of said particulate matter from said gaseous carrier and a particulate matter collection hopper disposed in the lower portion of said housing and below said filters therein for reception of said particulate matter separated from said gaseous carrier by said filters, the lower portion of said housing having an inlet opening therein disposed in fluid communication with a gas stream conveying conduit through which said gaseous carrier in the form of a confined high speed gas stream is introduced into said housing below said filters and in a direction substantially perpendicular to the longitudinal axis of said housing, said diffusing and distributing apparatus comprising, a plurality of perimetrically unconfined orifice plates disposed in parallel spaced apart relation in the path of the incoming high speed gas stream in substantially perpendicular relation to the direction of flow thereof;

the first of said plurality of orifice plates being disposed in separated spaced relation from said inlet opening and the remainder thereof extending substantially across the full extent of the lower portion of said housing, means for supporting said plurality of orifice plates, each of said orifice plates being a disc having a central aperture therein disposed in the path of said incoming high speed gas stream surrounded by a free standing and unconfined perimetric border portion of planar character disposed substantially perpendicular to the direction of incoming gas stream flow, and wherein each of said apertures in said orifice plate being of progressively lesser open cross sectional area in the direction of gas stream flow, whereby the peripheral portion of said incoming high velocity gas stream is successively diverted by the perimetric border portion of said orifice plates with a concommitant reduction in velocity thereof and a change of direction toward substantially parallel relation with the longitudinal axis of said perimetric housing.

2. Gas stream diffusing and distributing apparatus as described in claim 1 wherein the perimetric border area of each of said orifice plates is of gas impervious character and is of progressively lesser surface area in the direction of gas flow.

3. Gas stream diffusing and distributing apparatus as defined in claim 1 wherein said orifice plates are substantially equally spaced apart in the direction of gas stream flow.

4. Gas stream diffusing and distributing apparatus as defined in claim 1 and wherein the gas stream is introduced into said perimetric housing through an inlet conveying conduit of predetermined open cross sectional area, further comprising a first orifice plate disposed adjacent to said inlet conveying conduit having an open area equivalent to 84 to 89% of the open cross sectional area of said inlet conveying conduit.

5. Gas stream diffusing and distributing apparatus as defined in claim 1 and wherein the gas stream is introduced into said perimetric housing through an inlet conveying conduit of predetermined open cross sectional area, further comprising the first orifice plate disposed downstream of said inlet conveying conduit having an open area equivalent to 80 to 93% of the open cross section area of said inlet conveying conduit.

6. Gas stream diffusing and distributing apparatus as described in claim 5 wherein the orifice plate in said plurality thereof disposed remote from said inlet conveying orifice has an open area equivalent to 35 to 40% of the open cross sectional area of said inlet conveying conduit.

7. Gas stream diffusing and distributing apparatus as described in claim 5 wherein the perimetric border of the first orifice plate disposed adjacent to said inlet conveying conduit extends at least 2 inches beyond the longitudinal projection of the perimeter of the inlet conduit on such plate.

8. Gas stream diffusing and distributing apparatus as described in claim 5 wherein the cross sectional area of said first orifice plate is at least 150% of the cross sectional area of the inlet conveying conduit.

9. Gas stream diffusing and distribution apparatus as defined in claim 1 and wherein the gas stream is introduced into said perimetric housing through air inlet conveying conduit of predetermined open cross sectional area, and wherein each successive orifice plate, in the direction of gas flow, has a smaller aperture and smaller perimetric border area than the preceding orifice plate.

10. Gas stream diffusing and distribution apparatus as described in claim 1 further including a perforated plate member disposed downstream of the last orifice plate in the plurality thereof.

11. Gas stream diffusing and distribution apparatus as described in claim 10 wherein the perforated plate member has a cross sectional area within the perimetric border thereof of at least 150% of the cross sectional area of the aperture in the orifice plate disposed immediately upstream thereof.

* * * * *